United States Patent [19]

Kato et al.

[11] Patent Number: 4,726,261

[45] Date of Patent: Feb. 23, 1988

[54] TRANSMISSION SHIFT CONTROL VALVE HAVING FLUID PRESSURE DISTRIBUTOR VALVE

[75] Inventors: Yoshiaki Kato, Fujisawa; Nobuteru Hitomi, Yokohama; Yuji Gotoh, Yokohama; Yoshikazu Tanaka, Yokohama; Noboru Hattori, Yokosuka; Hisashi Kitahara, Yokosuka, all of Japan

[73] Assignee: Nissan Motor Co., Ltd., Yokohama, Japan

[21] Appl. No.: 843,683

[22] Filed: Mar. 25, 1986

[30] Foreign Application Priority Data

Mar. 26, 1985 [JP] Japan ............... 60-59365

[51] Int. Cl.$^4$ ............................................. B60K 41/06
[52] U.S. Cl. ............................................. 74/866; 74/867
[58] Field of Search ............ 74/866, 867, 868, 752 A, 74/752 C, 752 D, 856, 754, 740, 732

[56] References Cited

U.S. PATENT DOCUMENTS

| | | | |
|---|---|---|---|
| 3,016,769 | 1/1962 | Christenson et al. | 74/754 |
| 3,101,012 | 8/1963 | Christenson et al. | 74/752 C |
| 3,327,554 | 6/1967 | Searles | 74/869 |
| 3,732,753 | 5/1973 | Olsen et al. | 74/866 |
| 4,160,392 | 7/1979 | Sunohara et al. | 74/732 |
| 4,326,433 | 4/1982 | Black et al. | 74/740 |
| 4,338,832 | 7/1982 | Pelligrino | 74/867 |
| 4,345,489 | 8/1982 | Muller et al. | 74/866 X |
| 4,563,918 | 1/1986 | Sugano | 74/869 |
| 4,573,375 | 3/1986 | Hamada et al. | 74/866 X |
| 4,603,603 | 8/1986 | Salmon | 74/752 A X |

OTHER PUBLICATIONS

"Service Manual for Nissan Automatic Transmission L4N71B Type and E471B Type", pp. 37 and 38, Nov. 1982.

*Primary Examiner*—Leslie Braun
*Assistant Examiner*—David Novais
*Attorney, Agent, or Firm*—Schwartz, Jeffery, Schwaab, Mack, Blumenthal & Evans

[57] ABSTRACT

A hydraulic control system comprises a distributor valve including a valve body formed with a first port communicating with a pressure regulator and a second inlet port. The valve body is also formed with a plurality of outlet ports communicating with corresponding frictional elements, respectively. A solenoid operated relief valve is fluidly disposed between the pressure regulator and the second inlet port of the valve body. The distributor valve includes a rotary valve element operatively connected with a stepping motor. The rotary valve element is rotatably disposed within a bore of the valve body and has a plurality of angular positions for connecting the outlet ports to the first inlet port, second inlet port and drainage, selectively. The solenoid of the relief valve is of the proportioning type and is controlled by a control unit. The stepping motor is also controlled by the control unit.

5 Claims, 30 Drawing Figures

TRANSMISSION SHIFT CONTROL VALVE HAVING FLUID PRESSURE DISTRIBUTOR VALVE

BACKGROUND OF THE INVENTION

1. Field of the Invention

The present invention relates to a hydraulic control system for an automatic transmission which is shiftable between different gear ratios and which has a plurality of hydraulically operated frictional elements for effecting shifting.

2. Prior Art

U.S. patent application Ser. No. 462,337, now U.S. Pat. No. 4,573,375 issued to Hideo Hamada et al. on Mar. 4, 1986, discloses a hydraulic control system for an automatic transmission. This hydraulic control system equipped with a lock-up control has been employed in an E4N71 type Automatic Transmission manufactured by Nissan Motor Company Limited, and it is described in "SERVICE MANUAL FOR NISSAN AUTOMATIC TRANSMISSION L4N71B TYPE AND E4N71B TYPE" issued by Nissan Motor Company Limited in November 1982 (see Page 38). For better understanding of this hydraulic control system, reference should be made to the above mentioned U. S. Pat. No. 4,573,375.

This known transmission is shiftable between different gear ratios and has a plurality of frictional elements including a rear clutch (a forward clutch), a front clutch (a high and reverse clutch), a second brake, a low and reverse brake, a direct clutch, and an OD (overdrive) band brake, to effect shifting. The hydraulic control system comprises an oil pump serving as a fluid source, a pressure regulator valve communicating with the fluid source for generating a servo actuating fluid pressure, often called a "line pressure," a plurality of shift valves, each having an inlet port communicating with the line pressure regulator and an outlet port communicating with the corresponding one/ones of the plurality of frictional elements for selectively supplying hydraulic fluid to such frictional element or discharging hydraulic fluid therefrom, a plurality of flow rate adjusting means, including a flow restrictor, an accumulator, and a timing valve, fluidly disposed between the frictional elements and the shift valves. Each of these flow rate adjusting means is so designed as to provide an optimum pattern of variation of pressure build-up at the frictional element to be engaged to effect shifting without any substantial shocks. Thus, the circuit of this hydraulic control system is not simple.

A task to be solved by the present invention is to improve the hydraulic control system such that, with a simple hydraulic circuit, the pattern of variation of pressure build-up at a frictional element to be operated to effect shifting is changeable in response to operating conditions and also environmental conditions where the shifting is effected in order to reduce substantial shocks which occur during the shifting. For example, the pattern of variation of pressure build-up differs from one situation where the shifting is effected at a less abrupt acceleration to another where the shifting is effected at an abrupt acceleration. The environment where the shift is effected involves a change in temperature of the hydraulic fluid.

SUMMARY OF THE INVENTION

According to the present invention, there is provided a hydraulic control system for an automatic transmission which is shiftable between different gear ratios and which has a plurality of hydraulically operated frictional elements to effect shifting. The hydraulic control system comprises:

a fluid source;

means communicating with the fluid source for generating a fluid pressure;

a distributor valve including a valve body formed with a first inlet port communicating with the fluid pressure generating means and a second inlet port, the valve body being formed with a plurality of outlet ports communicating with at least some of the plurality of frictional elements, respectively, the valve body being formed with a bore having drainage;

fluid network means for connecting the second inlet port of the valve body to the fluid pressure generating means, said fluid network means including an electrically operated means for adjusting the rate of fluid flow supplied to said second port;

the distributor valve including electrically operated valve element means movably disposed within the bore, the valve element means having a plurality of positions for connecting the plurality of outlet ports to the first inlet port, second inlet port, and drainage, selectively whereby the pattern of variation of hydraulic fluid pressure build-up is transmitted via a selected one of the plurality of outlet ports to the frictional element which the selected one outlet port communicates with.

DESCRIPTION OF THE PREFERRED EMBODIMENT

Figure 1:
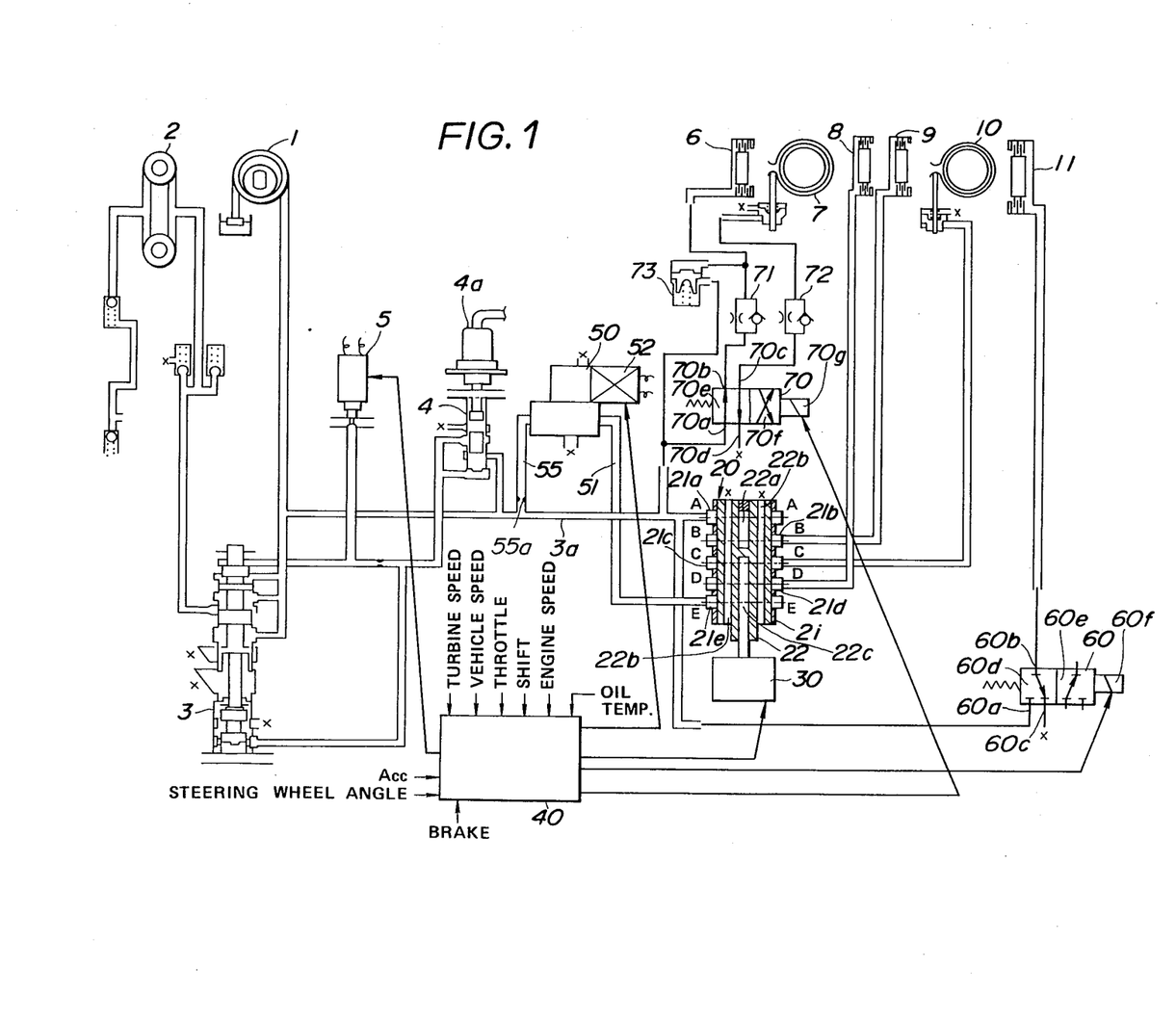
FIG. 1 is a schematic diagram showing a hydraulic control system for an automatic transmission embodying the present invention.

Referring to FIG. 1, a preferred embodiment of a hydraulic control according to the present invention is described. This hydraulic control system is designed to control the application and release of frictional elements in an automatic transmission of the type described in U.S. Pat. No. 4,573,375. The automatic transmission includes a torque converter 2. The frictional elements include a rear clutch 9 (a forward clutch), a front clutch 8 (a high and reverse clutch), a second brake 10, a low and reverse brake 11, a direct clutch 6, and an OD (overdrive) band brake 7. The hydraulic control system comprises an oil pump 1 serving as a fluid source, a pressure regulator valve 3 communicating with the fluid source 1 for generating a servo actuating fluid pressure, often called as a "line pressure," a vacuum throttle valve 4 having a vacuum diaphragm 4a communicating with an intake manifold of the engine, and a solenoid operated cut back valve 5. The pressure regulator valve 3, vacuum throttle valve, and solenoid operated cut back valve 5 are interconnected in such a manner that the line pressure varies with a variation in the engine intake manifold vacuum and with a cut back pressure generated as a result of operation of the solenoid operated cut back valve 5 such that the line pressure varies in a pattern corresponding to the pattern of torque supplied to a transmission input shaft through the torque converter 2 by the engine. The line pressure appears in a line pressure line 3a. The line pressure regulating valve arrangement including a regulator valve, a cut back valve and a throttle valve is disclosed in U.S. Pat. No. 4,563,918 issued to Kazuhiko SUGANO on Jan. 14, 1986, see a regulator valve 2, a cut back valve 14, a throttle valve 6 in FIGS. 2(a), 2(b), and 2(c). The similar line pressure regulating arrangement is disclosed in U.S. Pat. No. 3,327,554 issued to J. J. SEARLES, see a regulator valve 88, a cut back valve 416, and a vacuum operated throttle valve 172 in FIGS. 2A, 2B, and 2C.

In order to selectively supply hydraulic fluid to the frictional elements 6, 7, 8, 9, 10, and 11 or discharge hydraulic fluid therefrom, the hydraulic control system comprises a distributor valve 20, a first solenoid valve 60, and a second solenoid valve 70.

The first solenoid valve 60 has an inlet port 60a communicating with the line pressure line 3a, an outlet port 60b communicating with the low and reverse brake 11, and a drain port 60c. It has a spring set position 60d where the outlet port 60b is connected to the drain port 60c but disconnected from the inlet port 60a so that the hydraulic fluid is discharged from the low and reverse brake 11. It assumes another position 60and when a solenoid 60f thereof is energized. In this other position 60e, the outlet port 60b is disconnected from the drain port 60c and now connected to the inlet port 60a so that the hydraulic fluid is supplied from the line pressure line 3a to the low and reverse brake 11 to cause hydraulic fluid pressure build-up therein.

The second solenoid 70 has an inlet port 70a communicating with the line pressure line 3a, a first outlet port 70b communicating with the direct clutch 6 via a one-way flow restrictor 71, a second outlet port 70c communicating with the OD band brake 7 via a one-way flow restrictor 72, and a drain port 70d. It has a spring set position 70e where the first outlet port 70b is connected to the inlet port 70a, while the second outlet port 70c is connected to the drain port 70d so that the hydraulic fluid is supplied from the line pressure line 3a to the direct clutch 6 via the one-way flow restrictor 71 in a flow restricted manner and the hydraulic fluid is discharged from the OD band brake 7 via the one-way flow restrictor 72 in an unrestricted manner. It assumes another position 70f when a solenoid 70g thereof is energized. In this another position 70f, the first outlet port 70b is connected to the drain port 70d and the second outlet port 70c is connected to the inlet port 70a so that the hydraulic fluid is discharged from the direct clutch 6 via the one-way flow restrictor 71 in an unrestricted manner and the hydraulic fluid is supplied from the line pressure line 3a to the OD band brake 7 via the one-way flow restrictor 72 in a restricted manner. An accumulator 73 is provided to soften the application of the direct clutch 6.

The distributor rotary valve 20 includes a valve body 21 formed with a first inlet port 21a communicating with the line pressure line 3a and a second inlet port 21e. The valve body 21 is also formed with three outlet ports 21b, 21c, and 21d communicating with the rear clutch 9, second brake 10, and front clutch 8, respectively. It is formed with a bore having both of its axial ends opened, thus serving as drainage. Rotatably disposed in a seal tight manner within the bore of the valve body 21 is a rotary valve element 22. The rotary valve element 22 has five positions including a first position shown in FIGS. 2(A) to 2(E), a second position shown in FIGS. 3(A) to 3(E), a third position shown in FIGS. 4(A) to 4(E), a fourth position shown in FIGS. 5(A) to 5(E), and a fifth position shown in FIGS. 6(A) to 6(E) for connecting the outlet ports 21b, 21c, and 21d to the first inlet port 21a, second inlet port 21e, and the axial ends of the bore of the valve body 21 selectively. The rotary valve element 22 is operatively connected to a stepping motor 30 to be actuated thereby to turn to any desired one of five positions.

For connecting the second inlet port 21e to the line pressure line 3a, there is provided a fluid network means including an inflow passage 55, a solenoid operated relief valve of the balance piston type 50, and an output passage 51. The inflow passage 55 is connected to the line pressure line 3a via a flow restrictor 55a, while the output passage 51 is connected to the second inlet port 21e of the rotary valve 20.

Figure 7:
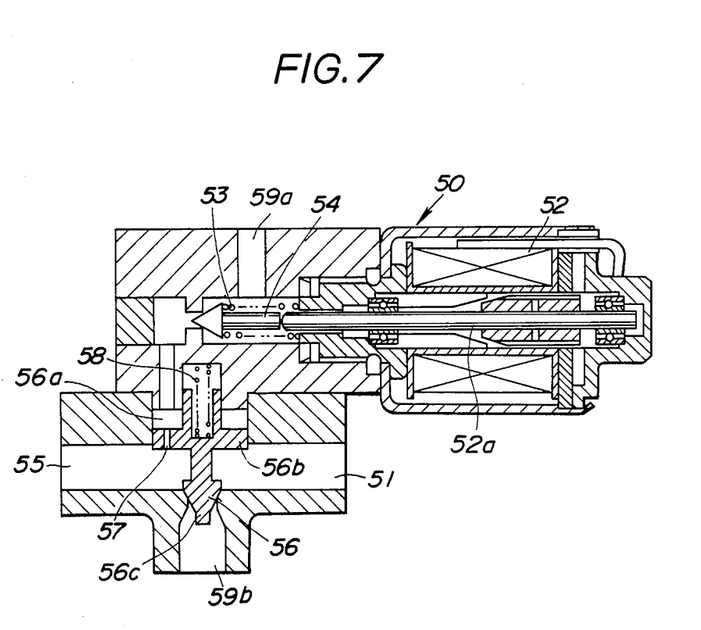
FIG. 7 is a schematic diagram, in longitudinal section, of an adjustment valve shown in FIG. 1.

Referring to FIG. 7, the relief valve 50 has a solenoid of the proportioning type 52. A plunger 52a of the solenoid 52 transmits a force electromagnetic induced by the solenoid 52 to a needle valve 54 that is also biased by a return spring 53. The needle valve 54 is provided to regulate the discharge of hydraulic fluid from a chamber 56a toward a drain port 59a. The chamber 56a is defined by a radial extension 56b of a balance piston 56 having a valve element 56c cooperating with a drain port 59b opening to a junction where the inflow passage 55 joins with the output passage 51. The balance piston 56 is biased by a spring 58 toward a position where the valve element 56c closes the drain port 59b. The radial extension 56b is formed with a flow restrictor 57 which provides a restricted flow communication between the inflow passage 55 and the chamber 56a. According to this construction of the relief valve 50, the output pressure prevailing in the output passage 51 is set by the bias force by the spring 53 and the electromagnetic force transmitted to the needle valve 54 by the plunger 52a of the solenoid 52. Thus, the output pressure can be set by controlling the amount of electric current passing through the solenoid 52.

Referring to FIGS. 2(A) to 2(E), the rotary valve element 22 is formed with a pair of drain through bores 22b which are arranged around the axis of rotation of the rotary valve element 22 in diametrically opposed relationship.

Figure 2A:
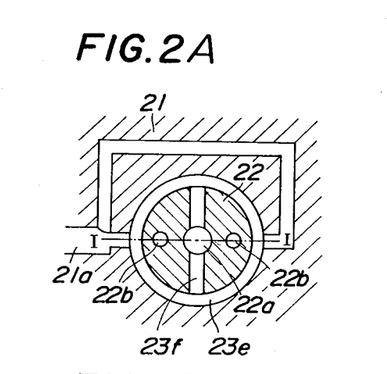
FIG. 2(A) to 2(E) are cross sectional diagrams of a distributor valve shown in FIG. 1 taken along lines A—A, B—B, C—C, D—D, and E—E, respectively, when the latter assumes a first position for providing a N (neutral) range in the automatic transmission.
Figure 2B:
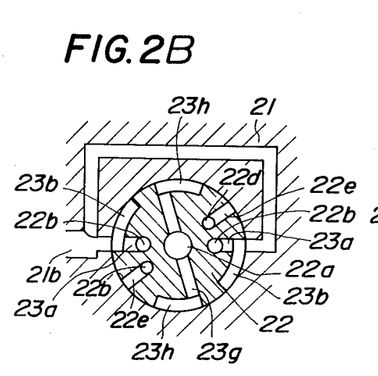
Figure 2C:
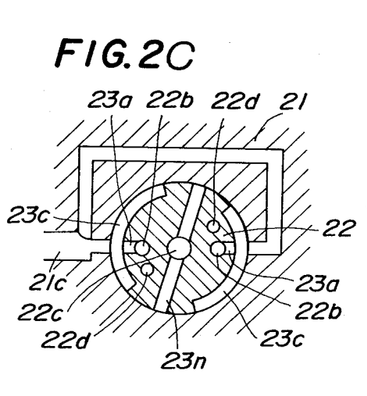
Figure 2D:
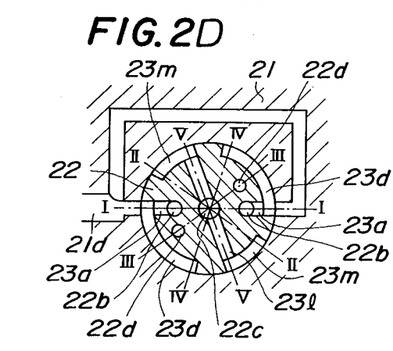
Figure 2E:
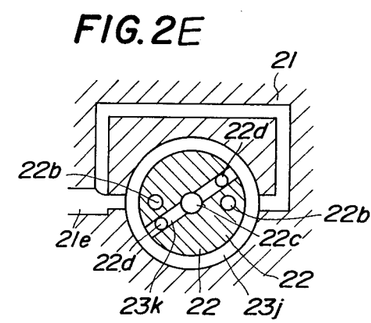

As best seen in FIGS. 2(B), 2(C), and 2(D), the pair of drain bores 22b have a pair of radial passages 23a, respectively, which communicate with a pair of first circumferential grooves 23b, respectively, at a level as shown in FIG. 2(B), with a pair of second circumferential grooves 23c, respectively, at a level as shown in FIG. 2(C), and with a pair of third circumferential grooves 23d at a level as shown in FIG. 2(D). Thus, the drain level pressure always prevails in a zone defined by the through bores 22b, radial passages 23a, circumferential grooves 23b, 23c and 23d. Referring to FIG. 2(A), the first inlet port 21a communicates with a circumferential groove 23e which in turn communicates with an axial passage 22a via a radial passage 23f. At a level as shown in FIG. 2(B), the axial passage 22a communicates with a radial passage 23g which communicates at its radial ends with a pair of circumferential grooves 23h, respectively. Thus, the line pressure always prevails in a zone defined by the circumferential groove 23e, radial passage 23f, axial passage 22a, radial passage 23g, and pair of circumferential grooves 23h. Referring to FIG. 2(E), the second inlet port 21e communicates with a circumferential groove 23j which in turn communicates with an axial passage 22c via a radial passage 23k. At a level as shown in FIG. 2(D), the axial passage 22c communicates with a radial passage 23l which communicates at its radial ends with a pair of circumferential grooves 23m, respectively. At a level as shown in FIG. 2(C), the axial passage 22c communicates with a radial passage 23n. As best seen in FIGS. 2(B), 2(C), 2(D), and 2(E), a pair of axial passages 22d has one ends communicating with the radial passage 23k at a level as shown in FIG. 2(E) and opposite ends communicating with a pair of radial passages 22e, respectively, at a level as shown in FIG. 2(B). Thus, the output pressure generated by the relief valve 50 always prevails in a zone defined by the circumferential groove 23j, radial passage 23k, radial passage 23l, circumferential grooves 23m, radial passage 23n, pair of axial passages 22d, and pair of radial passages 22e.

Referring to FIG. 1 a microcomputer based control unit 40 receives input signals indicative of oil temperature, engine speed, shift, throttle position, vehicle speed, turbine speed, acceleration, steering wheel angle, and brake application. Output signals generated by the control unit 40 are supplied to the cut back solenoid 5, proportioning type solenoid 52, stepping motor 30, solenoid 60f of the solenoid valve 60, and solenoid 70g of the solenoid valve 70, respectively.

The angle through which the stepping motor 30 is turned to rotate the rotary valve element 22 and the direction which the stepping motor 30 is turned in are determined by the control unit 40.

Hereinafter, the description proceeds regarding how the automatic transmission establishes different shift positions. The following Table shows which one or ones of the frictional elements 6, 7, 8, 9, 10, 11 are to be engaged so as to establish one of the shift positions.

| frictional element shift position | 6 | 7 | 8 | 9 | 10 | 11 |
|---|---|---|---|---|---|---|
| N range or P range | o | x | x | x | x | x |
| R range | o | x | o | x | x | o |
| D1 range | o | x | x | o | x | x |
| D2 range | o | x | x | o | o | x |
| D3 range | o | x | o | o | x | x |
| D4 range | x | o | o | o | x | x |
| 1 range | o | x | x | o | x | o |

In the Table, the reference character "o" represents the state where the particular frictional element is engaged, while the reference character "x" represents the state where the particular frictional element is disengaged or released. Since each of the frictional elements used in this automatic transmission is engaged when the hydraulic pressure which builds up exceeds the shelf pressure, the reference character "o" represents the state where the hydraulic fluid pressure is applied to the particular frictional element.

In order to establish a desired shift position, the stepping motor 30 is turned until the rotary valve element 22 of the distributor valve 20 assumes one of the plurality of angular positions as indicated by lines I—I, II—II, III—III, IV—IV, and V—V, respectively, and the solenoid valves 60 and 70 are turned ON (energized) or OFF (deenergized) in accordance with a schedule as shown in the following Table.

| shift position | angular position | solenoid valve 60 | solenoid valve 70 |
|---|---|---|---|
| N range or P range | I-I (FIG. 2) | OFF | OFF |
| D1 range | III-III (FIG. 4) | OFF | OFF |
| D2 range | IV-IV (FIG. 5) | OFF | OFF |
| D3 range | V-V (FIG. 6) | OFF | OFF |
| D4 range | V-V (FIG. 6) | OFF | ON |
| 1 range | III-III (FIG. 4) | ON | OFF |
| R range | II-II (FIG. 3) | ON | OFF |

When the manual shift lever, not shown, is placed at the N range or P range, the rotary valve element 22 assumes the angular position illustrated by FIGS. 2(A) to 2(E) where the line I—I assumes the zero degree, and both of the solenoid valves 60 and 70 are left turned OFF. As shown in FIG. 2(B), the outlet port 21b leading to the rear clutch 9 is connected to the drain through bores 22b via the circumferential grooves 23b and axial passages 23a so that the rear clutch 9 is left disengaged. As shown in FIG. 2(C), the outlet port 21c leading to the second band brake 10 is connected to the drain through bores 22b via the circumferential grooves 23i c and radial passages 23a so that the second band brake 10 is left disengaged or released. As shown in FIG. 2(D), the outlet port 21d leading to the front clutch 8 is connected to the drain through bores 22b via the circumferential grooves 23d and radial passages 23a so that the front clutch 8 is left disengaged. Deenergization of the solenoid 60f allows the solenoid valve 60 to assume the spring set position 60d where the outlet port 60b leading to the low and reverse brake 11 is connected to the drain port 60c so that the low and reverse brake 11 is left disengaged. Deenergization of the solenoid 70g allows the solenoid valve 70 to assume the spring set position 70e where the first outlet port 70b is connected to the inlet port 70a leading to the line pressure line 3a, while the second outlet port 70c is connected to the drain port 70d so that the line pressure is applied to the direct clutch 6 and the OD band brake 7 is left disengaged or released.

Figures 3A, 3B:
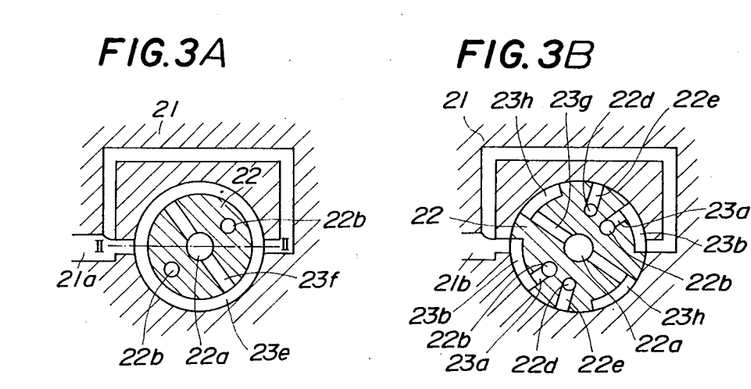
FIGS. 3(A) to 3(E) are cross sectional diagrams of the distributor valve taken along the lines A—A, B—B, C—C, D—D, and E—E, respectively, when the latter assumes a second position for providing a R (reverse) range in the automatic transmission.
Figure 3C:
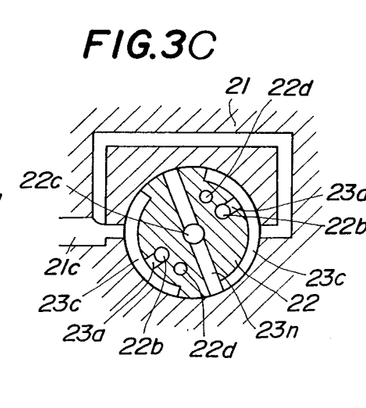
Figure 3D:
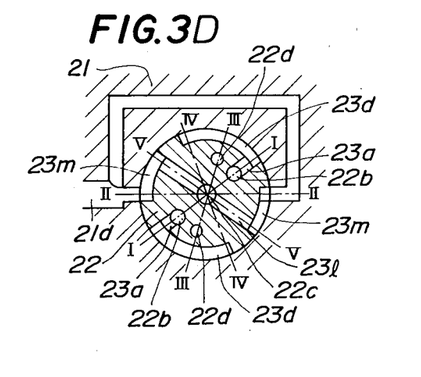
Figure 3E:
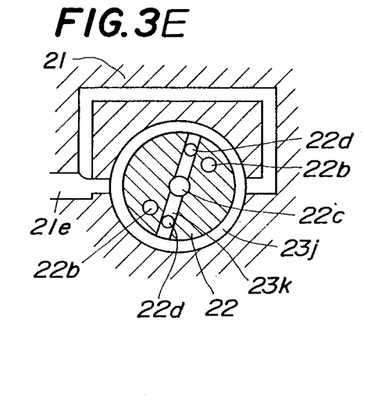

When the shift lever is shifted from the N range to the R range, the rotary valve element 22 is rotated to assume the position as illustrated in FIGS. 3(A) to 3(E) where the line II—II assumes the zero degree, and the solenoid valve 60 is turned ON although the solenoid valve 70 is left turned OFF. As shown in FIGS. 3(B) and 3(C), the outlet ports 21b and 21c are left connected to the drain through bores 22b because of the circumferential grooves 23b and 23c. As shown in FIG. 3(D), the outlet port 21d leading to the front clutch 8 is now connected to the second inlet port 21e via the circumferential grooves 23m, radial passage 23l, and axial passages 22c that is connected to the inlet port 21e via the radial passage 23k and circumferential groove 23j, see FIG. 3(E) also. This causes the output pressure of the relief valve 50 to be applied to the front clutch 8. Energization of the solenoid 60f causes the solenoid valve 60 to shift to the position 60e where the outlet port 60b is now connected to the inlet port 60a leading to the line pressure line 3a after being disconnected from the drain port 60c. This causes the hydraulic fluid to flow from the line pressure line 3a to the low and reverse brake 11 so that the low and reverse brake is engaged or applied. As a result, the R range is established in the transmission. During this shifting operation, the amount of electric current passing through the proportioning type solenoid 52 is increased at a gradual rate to cause the hydraulic pressure within the outlet passage 51 to increase at the gradual rate. Since this hydraulic pressure is applied to the front clutch 8, the front clutch 8 is engaged gradually without causing any substantial shocks.

Figure 4A:
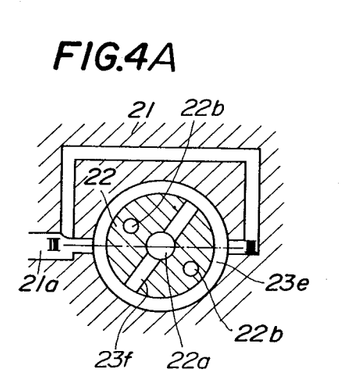
FIGS. 4(A) to 4(E) are cross sectional views of the distributor valve taken along the lines A—A, B—B, C—C, D—D, and E—E, respectively, when the latter assumes a third position for establishing a D1 range (a first speed in automatic drive range)
Figure 4B:
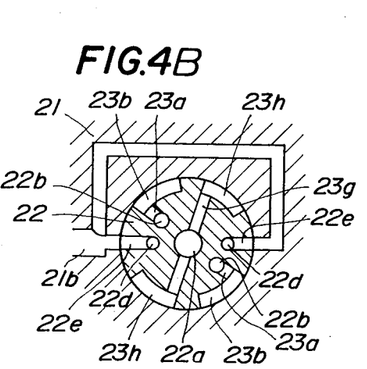
Figure 4C:
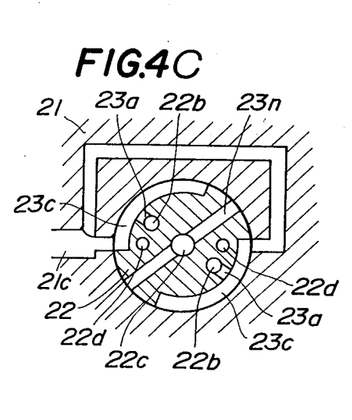
Figure 4D:
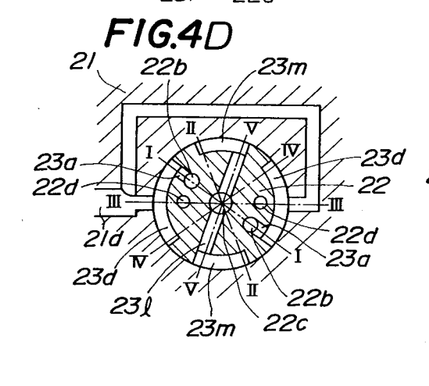
Figure 4E:
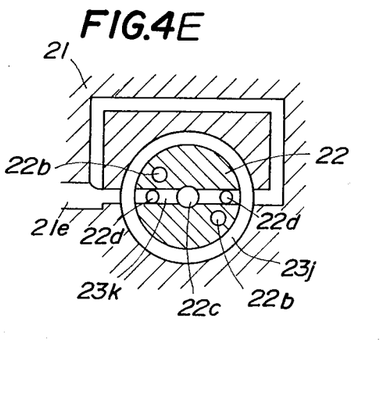

When the shift lever is shifted from the N range to the 1 (manual) range, the rotary valve element 22 is rotated until it assumes the position as illustrated in FIGS. 4(A) to 4(E) where the line III—III assumes the zero degree, and the solenoid valve 60 is turned ON although the solenoid valve 70 is left turned OFF. As shown in FIG. 4(C) and 4(D), the outlet ports 21c and 21d are left connected to the drain through bores 22b because of the circumferential grooves 23c and 23d. As shown in FIG. 4(B), the outlet port 21b leading to the rear clutch 9 is now connected to the inlet port 21e, see FIG. 4(E), via the radial passages 22e, axial passages 22d, radial passage 23k, and circumferential groove 23j. This causes the output pressure in the output passage 51 of the relief valve 50 to be applied to the rear clutch 9. The amount of current passing through the proportioning type solenoid 52 is increased at a gradual rate so as to cause the rear clutch 9 to be engaged at the gradual rate. Energization of the solenoid 60f causes the solenoid valve 60 to shift to the position 60e where the outlet port 60b is now connected to the inlet port 60a. This causes the hydraulic fluid to be supplied to the low and reverse brake 11.

When the shift lever is shifted from the N range to the D (Drive) range, the rotary valve element 22 is rotated from the position shown in FIGS. 2(A) to 2(E) to the position shown in FIGS. 4(A) to 4(E) where the line III—III assumes the zero degree, and the solenoid valves 60 and 70 are left turned OFF. As shown in FIGS. 4(C) and 4(D), the outlet ports 21c, and 21d are left connected to the drain through bores 22b. As shown in FIG. 4(B), the outlet port 21b leading to the rear clutch 9 is now connected to the second inlet port 21e, see FIG. 4(E), via the radial passages 22e, axial passages 22d, radial passage 23k, and circumferential groove 23j, thus allowing the output pressure of the relief valve 50 to be applied to the rear clutch 9. The amount of current passing through the proportioning type solenoid 52 is increased at a gradual rate so as to cause the fluid pressure building up at the rear clutch 9 to increase at the gradual rate. As a result, the rear clutch 9 is engaged without any substantial shocks and the D1 range is established.

Figure 5A:
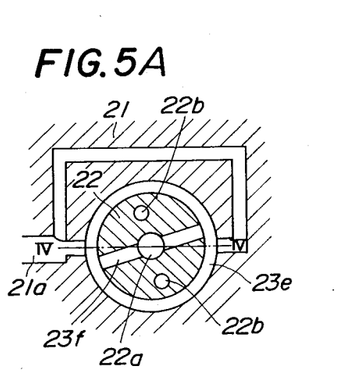
FIGS. 5(A) to 5(E) are cross sectional views of the distributor valve taken along the lines A—A, B—B, C—C, D—D, and E—E, respectively, when the latter assumes a fourth position for establishing a D2 range (a second speed in automatic drive range)
Figure 5B:
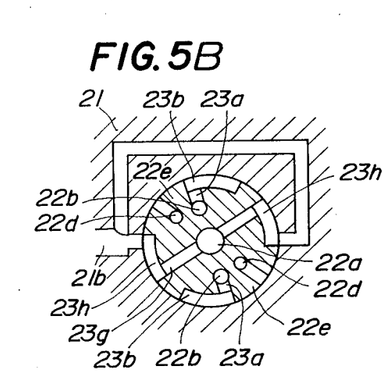
Figure 5C:
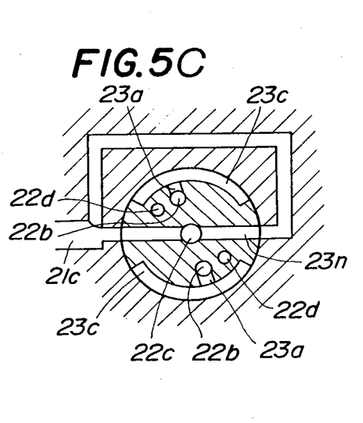
Figure 5D:
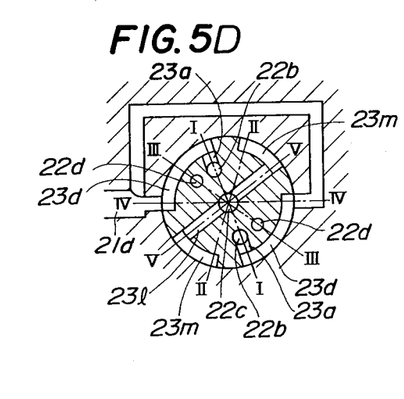
Figure 5E:
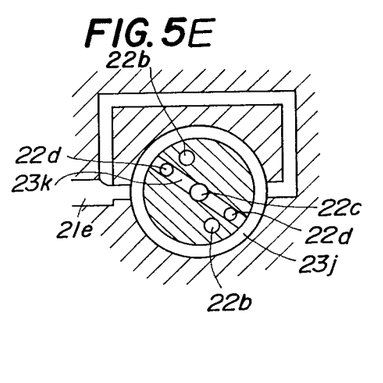

When there is a command to effect shifting from the D1 range to D2 range, the rotary valve element 22 is rotated from the position shown in FIGS. 4(A) to 4(E) to the position shown in FIGS. 5(A) to 5(E) where the line IV—IV assumes the zero degree although the solenoid valves 60 and 70 are left turned OFF. As shown in FIG. 5(B), the outlet port 21b is switched to the circumferential grooves 23h which in turn communicate with the first inlet port 21a, see FIG. 5(A), via the radial passage 23g, axial passage 22a, radial passage 23f, and circumferential groove 23e. Thus, the line pressure is kept applied to the rear clutch 9. As shown in FIG. 5(D), the outlet port 21d is left connected to the drain through bores 22b via the circumferential grooves 23d, and radial passages 23a. As shown in FIG. 5(C), the outlet port 21c is now connected in the radial passage 23n which in turn communicates with the second inlet port 21e, see FIG. 5(E), via the axial passage 22c, radial passage 23k, and circumferential groove 23j. The supply of current to the proportioning type solenoid 52 is cut OFF immediately after the port 21b has been disconnected from the radial passages 22e to cause a drop in hydraulic pressure supplied to the second inlet port 21e and thereafter the electric current is increased at a gradual rate. Thus, after the outlet port 21c has been connected to the second inlet port 21e, the second brake 10 connected to the outlet port 21c is engaged gradually by the hydraulic fluid pressure that increases in response to the amount of current passing through the proportioning type solenoid 52.

Figure 6A:
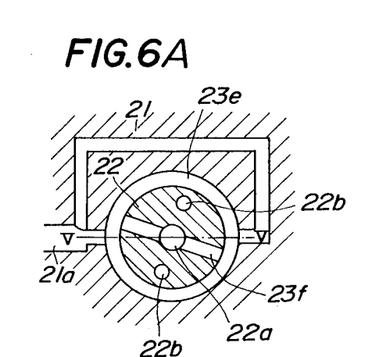
FIGS. 6(A) to 6(E) are cross sectional views of the distributor valve taken along the lines A—A, B—B, C—C, D—D, and E—E, respectively, when the latter assumes a fifth position for establishing a D3 range or D4 range (a third speed or fourth speed in automatic drive range)
Figure 6B:
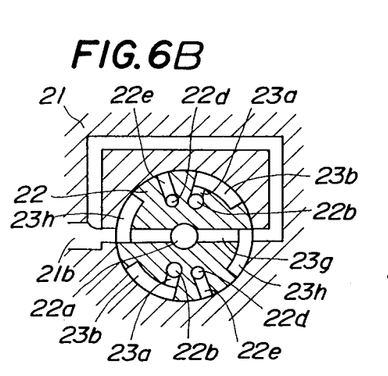
Figure 6C:
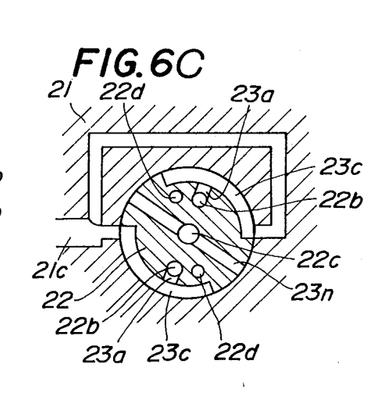
Figure 6D:
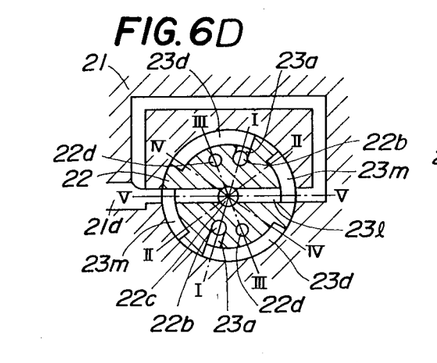
Figure 6E:
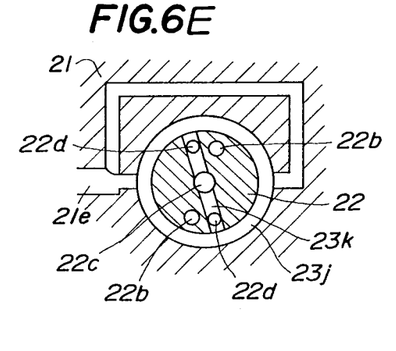

When there is a command to effect shifting from the D2 range to the D3 range, the rotary valve element 22 is rotated from the position as illustrated in FIGS. 5(A) to 5(E) to the position as illustrated in FIGS. 6(A) to 6(E) where the line V—V assumes the zero degree with the solenoid valves 60 and 70 left turned OFF. As shown in FIG. 6(B), the outlet port 21b is left connected with the first inlet port 21a that communicates with the line pressure line 3a. As shown in FIG. 6(C), the outlet port 21c is disconnected from the second inlet port 21e and then connected to the drain through bores 22b, while, as shown in FIG. 6(D), the outlet port 21d is disconnected from the drain through bores 22b and then connected to the second inlet port 21e via the circumferential grooves 23m, radial passage 23l, axial passage 22c, radial passage 23k, and circumferential groove 23j. Thus, the hydraulic fluid is discharged from the second brake 10 after the rotary element 22 has assumed the position as shown in FIG. 6(C) via the outlet port 21c toward the drain through bores 22b. After the outlet port 21c has been disconnected from the radial passage 23m, the supply of current to the proportioning type solenoid 52 is cut OFF to cause a drop in hydraulic fluid pressure in the output passage 51. After or immediately before the rotary valve element 22 assumes the position as illustrated in FIG. 6(D) when the front clutch 8 is brought into communication with the output passage 51 of the relief valve 50 via the outlet port 21d and the second inlet port 21e, the amount of current passing through the proportioning type solenoid 52 is increased at a rate that may be variable in response to the temperature of the hydraulic fluid and the throttle position in order to provide different patterns of variation of hydraulic fluid pressure supplied to the front clutch 8 as represented by curves X, Y, and Z shown in FIGS. 8(a), 8(b), and 8(c).

Figure 8A:
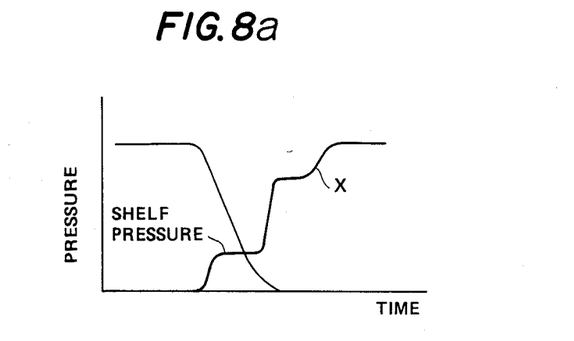
FIG. 8(a) shows a pattern of variation of hydraulic fluid pressure during an upshift from D2 range to D3 range at normal temperature of hydraulic fluid with small throttle opening degree.
Figure 8B:
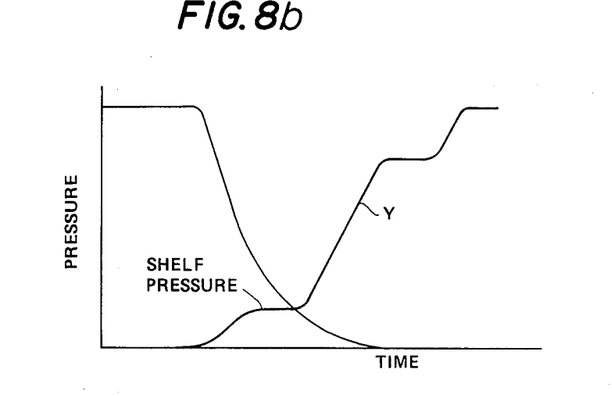
FIG. 8(b) shows a different pattern of variation in hydraulic fluid pressure during an upshift from D2 to D3 range at normal temperature of hydraulic fluid pressure with large throttle opening degree.
Figure 8C:
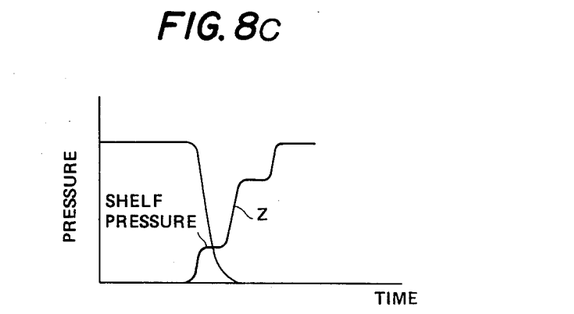
FIG. 8(c) shows a still another different pattern of variation in hydraulic fluid pressure during an upshift from D2 to D3 range at high temperature of hydraulic fluid with small throttle opening degree.

Referring to FIGS. 8(a), 8(b), and 8(c), FIG. 8(a) shows the manner of reduction in hydraulic fluid pressure supplied to the second brake 10 and the desired variation characteristic, as represented by the curve X, of hydraulic fluid pressure applied to the front clutch 8 for effecting shifting from D2 to D3 range under operating condition where the temperature of the hydraulic fluid is at the normal level and the throttle opening degree is small, while FIG. 8(c) shows the manner of reduction in hydraulic fluid pressure applied to the second brake 10 and the desired variation characteristic, as represented by the curve Z, of hydraulic fluid pressure applied to the front clutch 8 for effecting the shifting from D2 to D3 range under operating condition where the temperature of the hydraulic fluid pressure is high and the throttle opening degree is small. Comparing FIG. 8(a) with FIG. 8(c), it will be readily understood that the slope of the reduction in hydraulic fluid pressure applied to the front clutch 8 becomes steep as the temperature of the hydraulic fluid increases because the viscocity of the hydraulic fluid drops at high temperatures. Thus, in order to provide the desired curve Z, the current passing through the proportioning type solenoid 52 should rise quickly at high temperature of the hydraulic fluid. FIG. 8(b) shows the manner of reduction of hydraulic fluid pressure applied to the second brake 10 and the desired variation characteristic, as represented by the curve Y, of hydraulic fluid pressure applied to the front clutch 8 for effecting the shifting from the D2 to D3 range under operating condition where the temperature is at the normal level and the throttle opening degree is large. Comparing FIG. 8(a) with FIG. 8(b), it will be understood that the line pressure is boosted to a high level during operation at a large throttle opening degree as compared to the level of line pressure assumed during operation with a small throttle opening degree so that the timing at which the second brake 10 is released is delayed during operation with large throttle opening degree. Thus, the current passing through the proportioning type solenoid 52 should rise less quickly to provide the desired curve Y.

Since, the variation of hydraulic fluid pressure in the output passage 51 can be tailored to any desired pattern by controlling the amount of current passing through the proportioning type solenoid 52 of the relief valve 50, substantial shocks which might otherwise occur are suppressed to a sufficiently low level even if there occurs any change in other operating conditions or environment conditions.

When there is a command to effect shifting from the D3 to D4 range, the solenoid valve 70 is turned ON although the solenoid valve 60 is left turned OFF and the rotary valve element 22 stays in the position illustrated in FIGS. 6(A) to 6(E). Energization of the solenoid 70g causes the solenoid valve 70 to assume the position 70f causing the discharge of hydraulic fluid from the direct clutch 6 and the supply of hydraulic fluid to the OD band brake 7. This causes the disengagement of the direct clutch 6 and application of the OD band brake 7.

It will now be appreciated that according to this embodiment substantial shocks which otherwise would occur when shifting involving the engagement of any one of the frictional elements are suppressed to a sufficiently low level because the variation in hydraulic fluid pressure applied for engagement of the particular frictional element can be tailored to any desired pattern by controlling the amount of current passing through the proportioning type solenoid valve 52 in response to a change in operating and/or environment conditions.

It will also be appreciated that according to this embodiment since the distributor rotary valve 20 and the relief valve 50 are used, the number of valves in the hydraulic control system is considerably decreased, thus contributing to the miniturization of the automatic transmission.

What is claimed is:

1. A hydraulic control system for an automatic transmission which is shiftable between different gear ratios and which has a plurality of hydraulically operated frictional elements which are hydraulically actuated or deactuated to effect shifting, the hydraulic control system comprising:
   a fluid source;
   means communicating with said fluid source for generating a line fluid pressure;
   a distributor valve including a valve body formed with a first inlet port communicating with said line fluid pressure generating means and a second inlet port, said valve body being formed with a plurality of outlet ports communicating with at least some of the plurality of frictional elements, respectively, said valve body being formed with a bore having drainage;
   an electrically operated valve means for selectively increasing or decreasing a pressure developed in said second inlet port between substantially zero and the level of said line pressure at any desired rate with respect to time;
   said distributor valve including an electrically operated valve element means movably disposed within the bore of said valve body, the valve element means having a plurality of positions and being movable therebetween for connecting said second inlet port to one of the plurality of frictional elements via one of said plurality of outlet ports to subject the one frictional element to said pressure developed in said second inlet port in effecting shifting between different gear ratios.

2. A hydraulic control system as claimed in claim 1, wherein said electrically operated valve means includes first passage and groove means for defining a drain zone that is always in communication with said drainage, second passage and groove means for defining a line fluid pressure prevailing zone that is always in communication with said first inlet port, and third passage and groove means for defining a controlled fluid pressure prevailing zone that is always in communication with said second inlet port.

3. A hydraulic control system as claimed in claim 1, wherein said electrically operated valve means includes an inflow passage having one end connected to said line fluid pressure generating means via a flow restrictor, an output passage having one end connected to said inflow passage and an opposite end connected to said second inlet port, a drain port opening to said output passage, a solenoid, and a valve means operable by said solenoid for regulating the rate of hydraulic fluid discharged via said drain port.

4. A hydraulic control system as claimed in claim 1, wherein said plurality of positions include a first position wherein a first one of said plurality of outlet ports is connected to said second inlet port, a second one of said plurality of outlet ports is connected to said drainage, and a third one of said plurality of outlet ports is connected to said drainage, a second position wherein said first one of said plurality of outlet ports is connected to said first inlet port, said second one of said plurality of outlet ports is connected to said second inlet port, and said third one of said plurality of outlet ports is connected to said drainage, and a third position wherein said first one of said plurality of outlet ports is connected to said first inlet port, said second one of said plurality of outlet ports is connected to said drainage, and said third one of said plurality of outlet ports is connected to said second inlet port.

5. A hydraulic control system for an automatic transmission which is shiftable between different gear ratios and which has a plurality of hydraulically operated frictional elements to effect shifting, the plurality of hydraulically operated frictional elements including a first, a second, and a third frictional element, the hydraulic control system comprising:

a fluid source;

pressure regulator valve means communicating with said fluid source for generating a line fluid pressure;

a distributor valve including a valve body formed with a line fluid pressure inlet port and a controlled pressure port, said valve body being formed with a plurality of outlet ports communicating with the first, second, and third frictional elements, respectively, said valve body being formed with a bore serving as a drain;

means for defining a line fluid pressure supply passage connecting said pressure regulator valve means to said line fluid pressure inlet port of said distributor valve;

solenoid operated valve means including an inflow passage connected to said line fluid pressure supply passage via a flow restrictor, a drain port, and an output passage connected to said controlled fluid pressure port, said solenoid operated valve means being operative in a first mode where said drain port thereof is closed to allow application of said line fluid pressure to said controlled fluid pressure port, in a second mode where said drain port is fully opened to drain fluid from said controlled fluid pressure port, and in a third mode where the level of pressure applied to said controlled fluid pressure port is varied from substantially zero to the level of said line fluid pressure or from the level of said line fluid pressure to substantially zero at any desired rate with respect to time;

said distributor valve including a valve element movably disposed within said bore of said valve body, said valve element having a plurality of positions and being movable therebetween, said plurality of positions including a first position wherein the first frictional element is connected to said output passage of said solenoid operated valve means via said first outlet port and said controlled pressure port, the second frictional element is connected to said drain via said second outlet port, and the third frictional element is connected to said drain via said third outlet port, a second position wherein the first frictional element is connected to said line fluid pressure supply passage via said first outlet port, the second frictional element is connected to said output passage of said solenoid operated valve means via said first outlet port and said controlled fluid pressure port, and the third frictional element is connected to said drain via said third outlet port, and a third position wherein the first frictional element is connected to said line fluid pressure supply passage via said first outlet port and said line fluid pressure inlet port, the second frictional element is connected to said drain via said second outlet port, and the third frictional element is connected to said output passage of said solenoid operated valve means via said third outlet port and said controlled pressure port;

a motor operatively connected to said valve element and actuated to move said valve element to one of said plurality of positions; and control unit means for electrically controlling said solenoid operated valve means and said motor.

* * * * *